US007937373B2

(12) United States Patent
Bouse et al.

(10) Patent No.: US 7,937,373 B2
(45) Date of Patent: May 3, 2011

(54) METHOD AND APPARATUS FOR AUTOMATED STORAGE OF EVENT-SUBSTANTIATING DATA

(75) Inventors: Kai T. Bouse, Tellico Plains, TN (US); Christopher G. Hilemon, Knoxville, TN (US); Stewart V. Bowers, Knoxville, TN (US); Richard Piety, Knoxville, TN (US)

(73) Assignee: CSI Technology, Inc., Wilmington, DE (US)

( * ) Notice: Subject to any disclaimer, the term of this patent is extended or adjusted under 35 U.S.C. 154(b) by 474 days.

(21) Appl. No.: 12/205,326

(22) Filed: Sep. 5, 2008

(65) Prior Publication Data

US 2009/0070387 A1    Mar. 12, 2009

Related U.S. Application Data

(60) Provisional application No. 60/971,417, filed on Sep. 11, 2007, provisional application No. 60/970,734, filed on Sep. 7, 2007.

(51) Int. Cl.
*G06F 17/30* (2006.01)
*G06F 7/00* (2006.01)
(52) U.S. Cl. ......... 707/668; 707/688; 707/797; 714/100
(58) Field of Classification Search .................. 707/668, 707/688, 797; 714/100
See application file for complete search history.

(56) References Cited

U.S. PATENT DOCUMENTS

| 5,533,193 | A | * | 7/1996 | Roscoe ........................... 714/39 |
| 5,706,204 | A | | 1/1998 | Cox et al. |
| 6,658,450 | B1 | | 12/2003 | Balakrishnan et al. |
| 6,928,881 | B2 | | 8/2005 | Brennan |
| 7,020,546 | B2 | * | 3/2006 | Nagai et al. ..................... 701/29 |
| 7,281,112 | B1 | * | 10/2007 | Gross et al. .................... 711/170 |
| 7,747,844 | B2 | * | 6/2010 | McCormick et al. ......... 712/227 |
| 2007/0185913 | A1 | * | 8/2007 | Reichert et al. ............... 707/200 |
| 2007/0271306 | A1 | * | 11/2007 | Brown et al. .................. 707/200 |

* cited by examiner

*Primary Examiner* — Tim T. Vo
*Assistant Examiner* — Sangwoo Ahn
(74) *Attorney, Agent, or Firm* — Luedeka, Neely & Graham, P.C.

(57) ABSTRACT

A method for detecting an event and/or behavior of interest based on monitoring data and selectively storing portions of the monitoring data associated with the event and/or behavior of interest. Preferably, the method includes defining a hierarchy of event and/or behavior types so that the storing of a first behavior/event type is preferred over a second behavior/event type, especially when storing capacity is scarce. A data management apparatus including a logic device and a long-term storage memory apparatus, the logic device for detecting an event and/or behavior of interest based on monitoring data and selectively storing portions of the monitoring data associated with the event and/or behavior of interest on the long-term memory storage apparatus.

17 Claims, 3 Drawing Sheets

METHOD AND APPARATUS FOR AUTOMATED STORAGE OF EVENT-SUBSTANTIATING DATA

This nonprovisional application claims priority to U.S. provisional patent application No. 60/970,734 filed Sep. 7, 2007 and U.S. provisional patent application No. 60/971,417 filed Sep. 11, 2007.

FIELD

This disclosure relates to the field of data monitoring and storage. More particularly, this disclosure relates to a method and apparatus for selectively storing data associated with an event and/or behavior of interest.

BACKGROUND

Data management technology has become a paramount tool in the information age. The need for data analysts to have large sums and varied types of data at their fingertips has never been more desirable. Data management technology is particularly important in monitoring various types of equipment and/or systems, some of which are difficult to access on a predictable or routine basis. For these and all other types of equipment, automatic data collection is an option more and more frequently used in modern data management systems.

Many data management systems, however, manage vast sums of data that cannot be permanently stored without expending an unreasonable amount of money and resources for permanently archiving such data. Thus, strategies have been adopted to temporarily store data and monitor and/or analyze such data on a first-in-first-out (FIFO) basis. Certain monitoring technologies associated with data management systems allow data analysts to be alerted when an event of interest has occurred. In this way, data analysts may access temporarily stored data associated with an event in a timely manner.

Although the advances in data management technology described above are very useful, it is necessary for the transient data associated with an event of interest to be accessed before the data is deleted or otherwise replaced with newer data. Many types of equipment and/or systems are not easily accessible. Other types of equipment and/or systems have so many variables being monitored that it would be very difficult to timely access multiple sites if multiple events of interest are detected at substantially the same time. Still other types of equipment and/or systems are monitored in places where wireless data transfer is unreliable and the use of hard wiring from point to point is impracticable. Further, while many field devices are connected into control and monitoring networks with the ability to provide event notification to operators and maintenance personnel, the communication infrastructure typically connecting field devices is insufficient to move the quantity of data needed to provide post mortem analysis.

What is needed, therefore, is a method and apparatus for selectively and automatically storing data in long-term storage so that only pertinent data is kept long-term and an analyst may access such data at his or her convenience.

SUMMARY

The above and other needs are met by a method for automatically archiving data from a machine monitoring system before such data is deleted or overwritten, wherein the archived data is associated with an event of interest that is further associated with the events being monitored. A general embodiment of the method includes the steps of (a) storing data temporarily on a first-in-first-out basis; (b) defining a primary event of interest; (c) detecting an occurrence of the primary event of interest automatically based on the data; and (d) sending data values associated with the occurrence of the primary event of interest to long-term data storage, wherein the data associated with the occurrence of the primary event of interest includes data that was temporarily stored prior to and substantially during the occurrence of the primary event of interest. In a related embodiment, the method preferably further includes the steps of (e) defining a first hierarchy to distinguish the primary event of interest from a secondary event of interest, wherein the primary event of interest is considered of higher importance than the secondary event of interest; and (f) replacing data associated with the secondary event of interest in the long-term data storage with data associated with the primary event of interest. In a related embodiment, step (f) occurs in response to a signal indicating that the long-term data storage is unable to substantially simultaneously store both the data associated with the secondary event of interest and the data associated with the primary event of interest.

In one embodiment, the primary event of interest is defined as one or more data values that exist outside of a pre-defined data range. In a related embodiment, the defined first hierarchy includes a first class of events and a second class of events, wherein the first class of events are considered to be of higher importance than the second class of events, and wherein the first class of events includes the primary event of interest and the second class of events includes the secondary event of interest.

In still another related embodiment, the method includes the step of (g) calculating the deviation of a portion of data from the pre-defined data range. This embodiment may also include the step of (h) comparing a first deviation of a first portion of data to a second deviation of a second portion of data in order to determine which deviation is greater. Additionally, this embodiment may further include the step of (i) deleting or overwriting data associated with the first portion of data if the second deviation is greater than the first deviation. In a related embodiment, the first hierarchy includes the first portion of data and the second portion of data. In yet another related embodiment, the portion of data, the first portion of data, and/or the second portion of data may consist of a single data value.

The disclosure further includes a method for automatically archiving data in a data management system before such data is deleted or overwritten, wherein the archived data is associated with a detected event, the method including the steps of (a) storing data temporarily on a first-in-first-out basis; (b) defining a standard performance range; (c) detecting a first event occurring outside of the standard performance range; and (d) sending data values associated with the first detected event to long-term data storage, wherein the data associated with the first detected event includes data that was temporarily stored prior to and substantially during the occurrence of the first detected event. The method may further include the steps of (e) defining a first hierarchy to distinguish the first detected event from a second detected event, wherein the first detected event is considered of higher importance than the second detected event; and (f) replacing data associated with the second detected event in the long-term data storage with data associated with the first detected event if the long-term data storage is unable to substantially simultaneously store both the data associated with the second detected event and the data associated with the first detected event. In a preferred embodiment, the defined first hierarchy includes a first class of events and a second class of events, wherein the first class of events are considered to be of higher importance than the second class of events, and wherein the first class of events includes the first detected event and the second class of events includes the second detected event.

This method may further include the steps of (g) calculating the deviation of a portion of data from the standard performance range; and (h) comparing a first deviation of a first portion of data to a second deviation of a second portion of data in order to determine which deviation is greater. This method may further include the step of (i) deleting or overwriting data associated with the first portion of data if the second deviation is greater than the first deviation. In one embodiment, the first hierarchy includes the first portion of data and the second portion of data.

Other preferred embodiments provide a data management apparatus used in conjunction with the monitoring of the performance of a machine or system, wherein the data management apparatus is configured to automatically archive data associated with an event of interest before such data is deleted or overwritten. In a general embodiment, the data management apparatus includes a logic device configured for detecting that an event of interest has occurred based on a portion of data that falls outside of a programmed range of data values, and distinguishing between a first type of event of interest and a second type of event of interest. A long-term data storage device is communicatively connected with the logic device, wherein data associated with the detected occurrence of an event of interest is sent to the long-term data storage device to be archived based on the detected occurrence of the event of interest by the logic device. The data management apparatus is configured for deleting or overwriting data associated with the second type of event of interest saved on the long-term data storage device as needed to provide memory storage space for data associated with the first type of event of interest.

In one embodiment, the logic device is further configured for distinguishing between a first deviation of a first detected occurrence of the first type of event of interest and a second deviation of a second occurrence of the first type of event of interest, wherein the first deviation is greater than the second deviation, and wherein the data management apparatus is configured for deleting or overwriting data associated with the second deviation of the second detected occurrence saved on the long-term data storage device as needed to provide memory storage space for data associated with the first deviation of the first detected occurrence.

In yet another embodiment, the data management apparatus further includes a short-term data storage device that stores data on a first-in-first-out basis and that is communicatively connected with the long-term data storage device and the programmable logic device.

Some of the advantages of the embodiments disclosed herein include the ability to autonomously record data associated with events and/or behaviors of interest that an object undergoes through time in remote and/or dangerous locations. One specific advantage of one of the embodiments is the ability to overwrite less crucial data of a first type with more crucial data of a second type in circumstances in which, for example, data memory storage becomes depleted. Another embodiment provides a way for separate data sets of the same type to be compared and for the set of most importance or significance to take precedence over the set or sets of less significance (e.g., based on a comparison of the magnitudes of deviation from a set tolerance range).

As opposed to a simple comparison of a value with a static threshold, the thresholds for comparison may themselves be dynamically calculated. Also, the definition of ordering precedence may be arbitrarily complex and could be the output of an entire decision making subsystem. The relative importance defining the precedence of events may also be dynamically determined and may change, such as the specification by a user that one piece of equipment is more important than another when monitoring multiple pieces of equipment with a single monitoring device, or the result of a weighting arbitration calculation that takes into account scheduling and production requirements versus spares stock available for failure risk mitigation. This prioritization takes precedence over simple magnitude thresholds such that data relating to a numerically "more severe" measurement may be discarded in favor of data describing an event involving a "more significant" piece of equipment.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Figure 1:
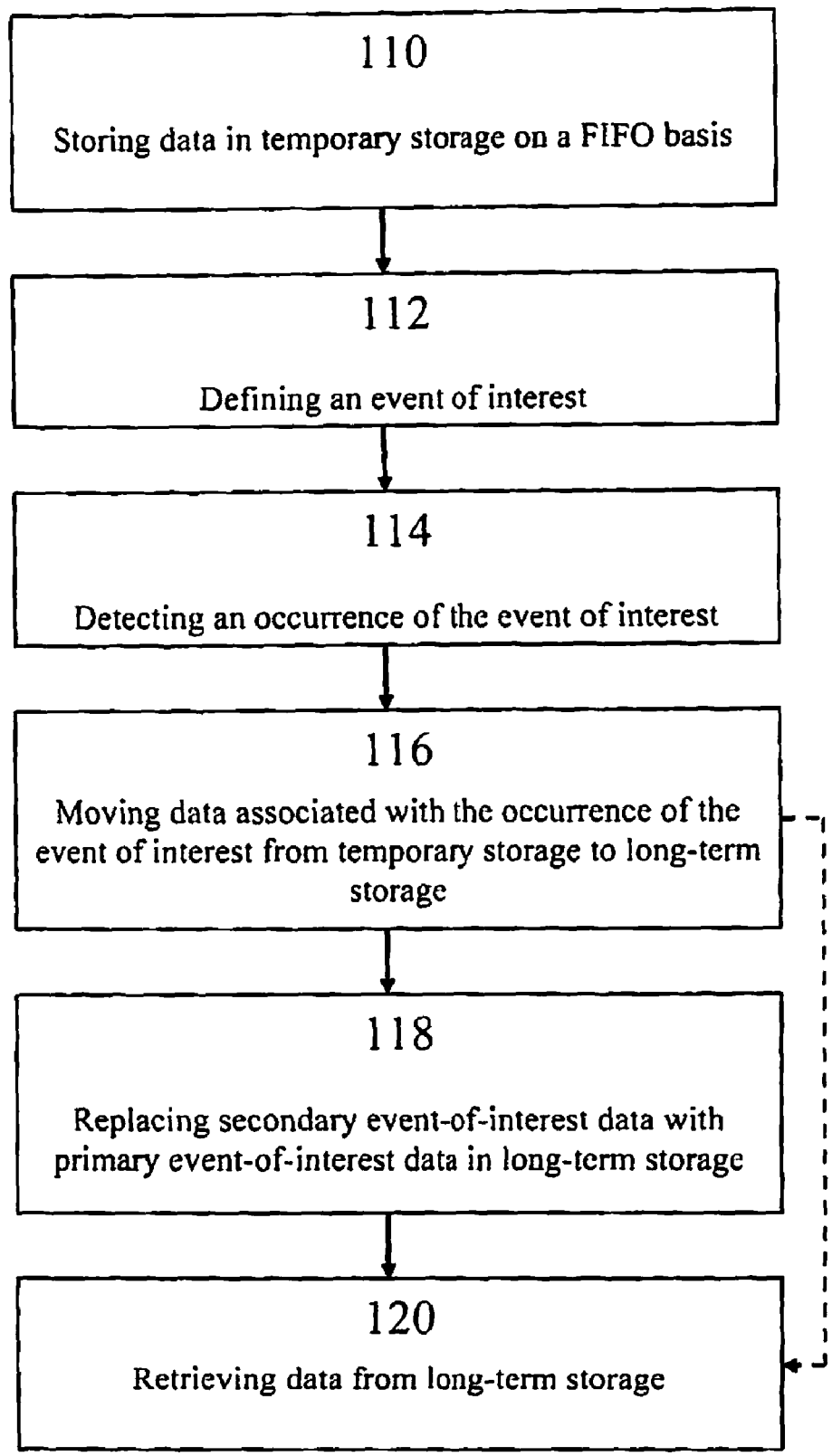
FIG. 1 shows a functional flow diagram of a method for automatically and selectively archiving data.
Figure 2:
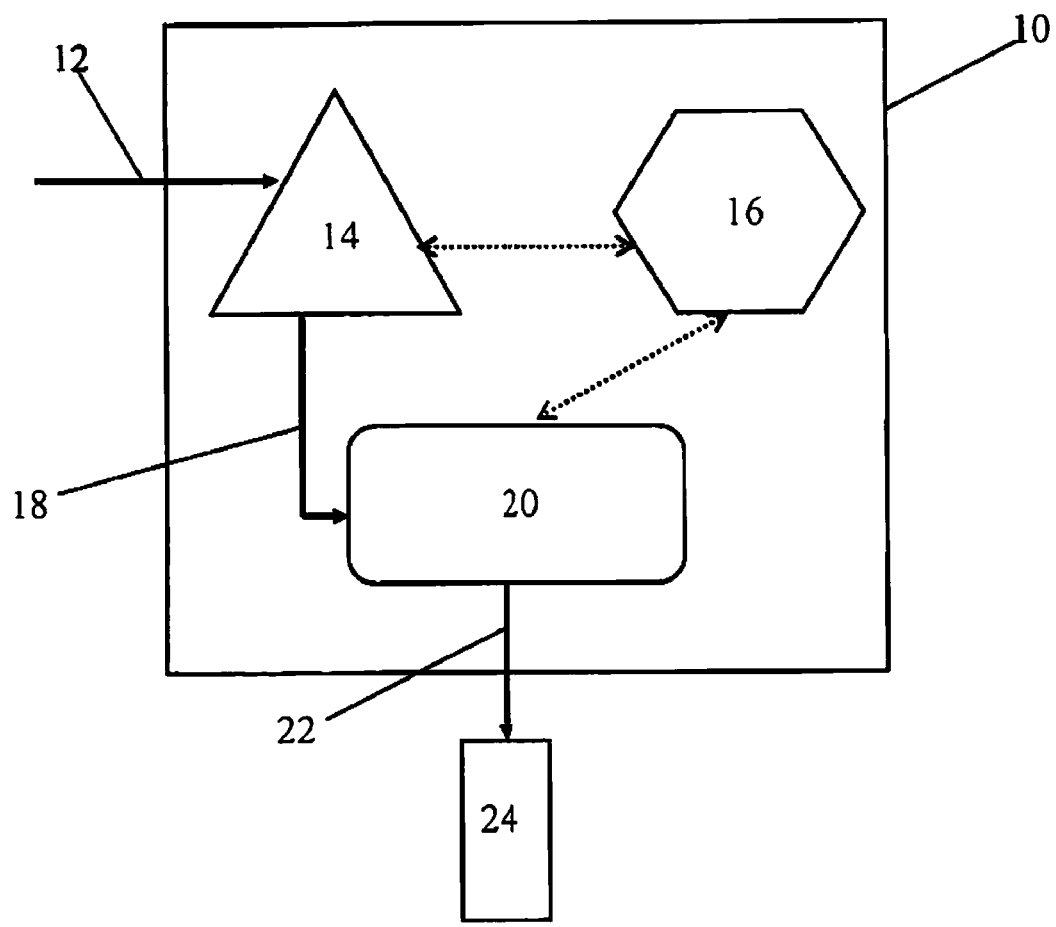
FIG. 2 shows a partially schematic block diagram of a first embodiment of an apparatus for automatically archiving data.

FIG. 1 depicts the steps included in an embodiment of a method for automatically archiving data in a data management system before such data is deleted or overwritten by subsequent data. In this and other embodiments of the invention, the archived data is associated with an event of interest and the event of interest is associated with a machine and/or a system being monitored by a monitoring device. In a preferred embodiment, the monitoring device includes the data management system. FIG. 2 shows a somewhat schematic block diagram of a data management system 10 used in performing the steps of FIG. 1. Step 110 includes temporarily storing data 12 on a first-in-first-out (FIFO) basis in short-term data storage device 14. Thus, the data 12 in Step 110 is transient in nature and is only available for a limited time before it is overwritten by subsequent data. A FIFO buffer, for example, may be used as short-term data storage device 14. Step 112 includes defining an event of interest such as, for example, machine performance that results in values of the data 12 that satisfy some arbitrary criteria of being unacceptable, such as falling outside of a predetermined tolerance range. The definitions associated with Step 112 may be stored in system logic 16, which may include, for example, an executable software program or module, embedded firmware rules or a relay ladder logic program, a Field Programmable Gate Array (FPGA) or other hardware-based triggering circuit, and/or other similar device known to a person having ordinary skill in the art. It should be apparent to those skilled in the art that Step 110 and Step 112 occur in no particular order with respect to one another. Step 114 includes automatically detecting an occurrence of an event of interest when the data 12 goes beyond a limit defined in step 112. During or soon after the detection of an event of interest, the data 18 associated with the event of interest is moved from or copied from short-term data storage device 14 to the long-term data storage device 20 (Step 116). The data 18 associated with the event of interest is stored for safe keeping preferably at least until an analyst has an opportunity to access and retrieve the data 18 stored in the long-term data storage device 20 (Step 120). The long-term data storage device 20 may take the form of any data storage device known to those skilled in the art including, but not limited to, non-volatile RAM, flash memory, magnetic disk drives and/or optical disk drives.

In another embodiment, Step 112 further includes defining a primary event of interest and a secondary event of interest. Although only two hierarchical levels are discussed herein, those skilled in the art appreciate that any number of hierarchical levels of events of interest could be defined with logic to determine which hierarchical level is of the most importance in a given data storage scenario. Further, one could have multiple hierarchies or other classes of criteria, each associated with independent data storage dedicated to events of each class. In this particular embodiment, Step 112 further includes defining a hierarchy to distinguish the primary event of interest from the secondary event of interest. This embodiment includes an additional Step 118 that includes replacing data associated with the secondary event of interest with data associated with the primary event of interest. In a preferred embodiment, Step 118 occurs in response to a signal from, for example, the long-term data storage device 20 indicating that the long-term data storage device 20 is unable to simultaneously store both the data associated with the secondary event of interest and the data associated with the primary event of interest. Thus, even if data is overwritten in the long-term data storage device 20 due to a scarcity of memory capacity (or other cause that limits the memory capacity of the long-term data storage device 20), the most important data, regardless of when it was stored in the long-term data storage device 20, will be available for an analyst to retrieve such data (i.e., a retrieving step, Step 120). Step 120 may include the transfer of requested data 22 from the long-term data storage device 20 to a memory destination 24 such as, for example, a memory destination associated with a personal computer system used by the data analyst.

Although the embodiments described herein cover situations in which an analyst accesses the data stored in a long-term data storage device by any means of communicating data such as, for example, a hardwired network (e.g., electrical or fiber-optic), a wireless network (e.g., infrared or RF) or a combination of hardwired and wireless networks, the embodiments of the method described herein are perhaps most useful in situations where wireless communication and hardwired communication are unreliable or impracticable. In other words, the embodiments of the method described herein are most useful when a particular hardware system requires a data analyst to access data substantially at the site where the raw data is stored in the long-term data storage device 20. Many such data storage sites (e.g., locations within nuclear reactors, locations underwater, or other difficult to reach places) are not available for the routine downloading or uploading of data. Therefore, a system that autonomously records data of interest and then archives such data based on a pre-defined hierarchy is highly desirable and perfectly suitable for such applications.

An example of how the various embodiments of the method described herein may be used includes the continuous monitoring and data management of an industrial pump. In this setting, data associated with conditions of cavitation, seal rubs, vane pass, and bearing frequencies are monitored closely, along with speed, temperature, and flux measurements on the driving motor. Such measurements as would normally be made manually by an equipment condition analyst are instead made automatically by a monitoring device. These data are stored continuously in short-term memory at some defined interval over some defined period, say every 30 minutes for 30 days. These data are managed in a FIFO fashion such that only the most recent 30 days are available at any point in time. An event of interest may be defined as when the monitored vibration energy associated with a particular failure signature exceeds certain criteria, such as an increase in high-frequency energy associated with possible early bearing degradation. If and when a measured value satisfies the criteria defined in system logic 16, a representative portion or "snapshot" of the current FIFO-buffered data is sent to the long-term data storage device 20. The representative portion may be truncated as a summary of data (e.g., every five data points) or the representation file may include all of the data points within the FIFO-buffered data substantially when the criteria defined in system logic 16 is satisfied. This provides a history of the behavior of the pump leading up to the event of interest. The representative portion could also be a statistical characterization or a maximum value over time, rather than a simple decimation.

In the case of monitoring vibration on the rotating components of a machine, it is additionally valuable to store time waveform data and/or the spectral representation as produced by a Fourier transform. This provides a data set which represents the conditions of the monitored machine at the point of event detection, as well as a reasonable picture of the onset period. It will be apparent to one familiar with both equipment condition monitoring and typical field device networks that the volume of data on a multi-channel analytical device is excessive for transport over typical field device networks and would otherwise be unavailable to the analyst within a short period of time if a mechanism for storage and retrieval were not provided.

In a related example, embodiments of the method described herein may be used with a plurality of different types of data, each of which are given a hierarchical value. Continuing with the pump example, a data management system may recognize multiple levels of severity of a given fault. In a preferred embodiment, if the data management system 10 detects a first event of interest, such as an increase in energy associated with the pump bearing occurring between times $t_1$ and $t_2$, the data from that time period associated with that first event of interest is moved from the short-term data storage device 14 to the long-term data storage device 20. Similarly, if the data management system 10 detects a second event of interest, such as an increase in energy associated with the motor bearing occurring between time $t_3$ and $t_4$, the data from that time period associated with that second event of interest that was stored in the short-term data storage device 14 is moved to the long-term data storage device 20.

For the purposes of illustration, assume that at time $t_4$, the long-term data storage device 20 has reached its storage capacity such that no additional data may be stored there unless data previously stored in the long-term data storage device 20 is overwritten or otherwise deleted. If a third event of interest is detected, such as an increase in energy associated with the pump bearing that occurred between time $t_5$ and $t_6$, and the severity of the third event is determined to be more serious than the prior event related to the pump bearing, the data from that time period associated with the third event of interest that was stored in the short-term data storage device 14 is moved to the long-term data storage device 20, overwriting the data associated with the first event of interest regarding the pump bearing. If the class of the fault is different than the prior event, say a change in the energy associated with vane pass in the pump, and the relative priorities of the new fault class are designated higher than the previous event, then the data from that time period associated with the third event of interest that was stored in the short-term data storage device 14 is moved to the long-term data storage device 20, overwriting the data associated with the prior event of interest.

If all events detected after exhausting the available capacity of the long-term data storage device 20 are of lesser severity and within the same class as a prior event, or are of a class with lesser priority than the prior event, the event data associated with the new events will be discarded. This condition continues until the data in the long-term data storage device 20 is retrieved and/or at least a portion of the retrieved data is deleted from the long-term data storage device 20, thereby making more storage space available. This approach allows for prioritization according to customer preference as to which events are of most concern within their environment. The approach maximizes the data available for analyzing detected events of concern, while minimizing the impact on the customer by retaining the most relevant and important data for the longest possible time.

Figure 3:
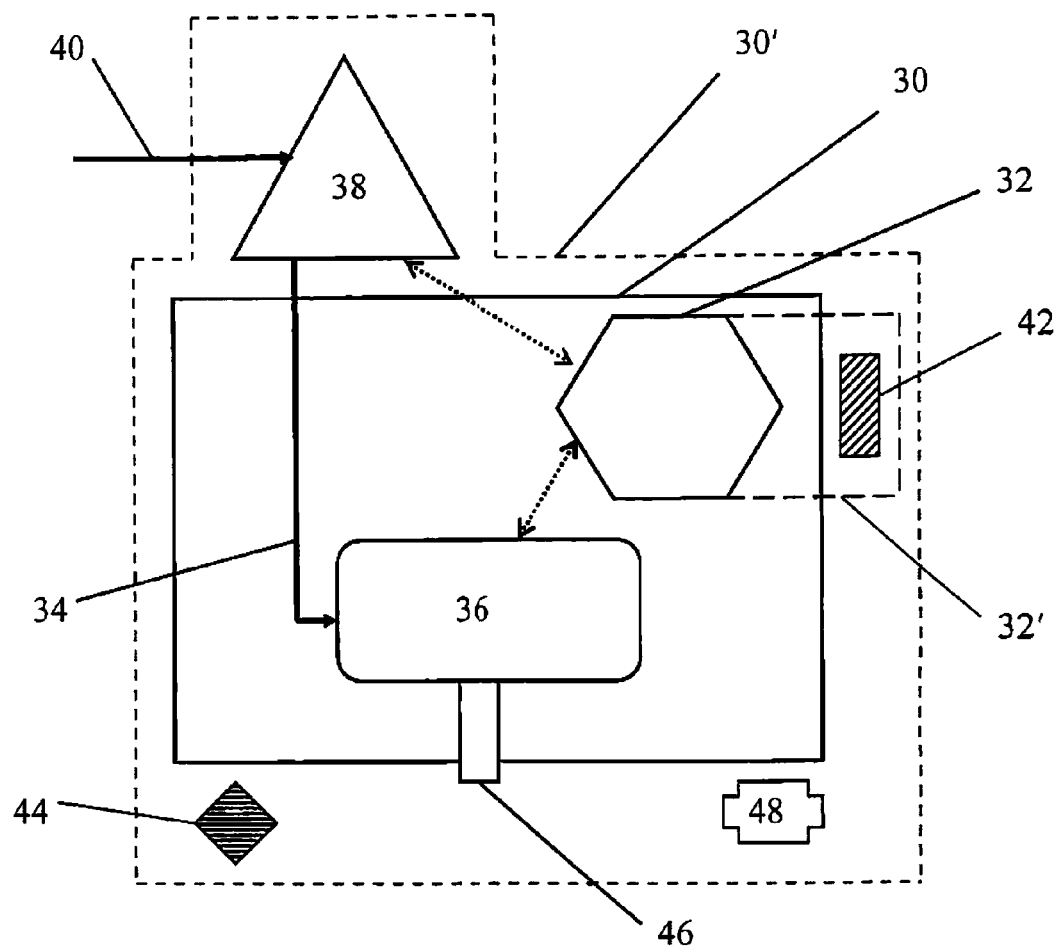
FIG. 3 shows a partially schematic block diagram of a related embodiment of an apparatus for automatically archiving data.

As shown in FIG. 3, this disclosure includes a data management apparatus 30 used in conjunction with the monitoring of the performance of a machine or system (e.g., a pump). In a preferred embodiment, the data management apparatus 30 is configured for automatically archiving data associated with a performance characteristic of interest before such data is deleted or overwritten. In a preferred embodiment, the data management apparatus 30 includes a logic device 32 configured for detecting that an event of interest has occurred based on a portion of data 34 that falls outside of a programmed range of data values, and for distinguishing between a first type of behavior of interest and a second type of behavior of interest. Examples of the logic device 32 include an executable software program or module as a decision-making subsystem, embedded firmware rules or relay ladder logic program providing a Boolean output, an FPGA or other hardware-based triggering circuit yielding a binary signal, or other similar device known to a person having ordinary skill in the art. The data management apparatus 30 further includes a long-term data storage device 36 communicatively connected with the logic device 32. The term "communicatively connected" is broadly defined herein to connote communication between separate objects whether by hardwired means (e.g., common metal wiring), wireless means (e.g., infrared technology), or other communication and/or data exchange means known to a person having ordinary skill in the art. A hardwired configuration is preferred for reasons of reliability and security. The portion of data 34 associated with the detected occurrence of an event of interest is sent to the long-term data storage device 36 to be archived based on the detected occurrence of an event of interest by the logic device 32. The data management apparatus 30 is configured for deleting or overwriting data associated with the second type of event of interest saved on the long-term data storage device 36 as needed to provide memory storage space for data associated with the first type of event of interest.

In a related embodiment, the data management apparatus 30 also includes a short-term data storage device 38 that stores operational data 40 on a FIFO basis and that is communicatively connected with the long-term data storage device 36 and the logic device 32. As operational data is saved and deleted and/or overwritten on the short-term data storage device 38, the logic device 32 monitors the data 40 for an event of interest by preferably running the FIFO data through a data filter 42. If a data value falls outside of a programmed range of typical performance, an event of interest indicator signal is triggered by the logic device 32. The event of interest indicator signal causes the data stored in the short-term data storage device 38 to be sent or otherwise copied to the long-term data storage device 36. The saved data may later be retrieved by, for example, an analyst to analyze the saved data. Such retrieval may include, for example, a wireless transmission of the data from a transmitter 44. Alternatively or additionally, such retrieval may take place onsite by accessing the data management apparatus 30 via a memory port 46 (e.g., a USB port or other data transmission hardwire port).

In a preferred embodiment, the data management system 30 includes a back-up power source 48 (e.g., a battery) so that performance is not disrupted in case of sporadic power fluctuation or power outage.

In yet another embodiment, the logic device 32 is further configured for distinguishing between a first deviation of a first detected occurrence of the first type of event of interest and a second deviation of a second occurrence of the first type of event of interest. In this embodiment, when the first deviation is greater than the second deviation, the data management apparatus 30 is configured for deleting and/or overwriting data associated with the second deviation of the second detected occurrence saved on the long-term data storage device 36 as needed to provide storage space for data associated with the first deviation of the first detected occurrence. This feature is important because the magnitude of a particular deviation from typical performance often corresponds to the significance of an occurrence of the particular event of interest. Based on this assumption, data that is more significant should replace data that is less significant in the event that storage space on the long-term data storage device 36 becomes scarce.

An important benefit of the apparatus described above is that it is substantially autonomous. After the logic device 32 is programmed, the data management system 10 needs substantially no further input from outside sources other than power for long-term operation.

Although examples involving pumps have been given for illustration, the various embodiments of the method described herein may used in a wide array of fields encompassing completely unrelated technologies and subjects. For example, the behavior of an animal may be monitored in the wild using equipment attached to the animal and/or a particular area of space may be monitored using remote telescopes. Therefore, the foregoing disclosure of preferred embodiments for this invention has been presented for purposes of illustration and description. The embodiments described herein are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for automatically archiving data collected by a machine monitoring system before such data is deleted or overwritten, wherein the archived data is associated with a detected event of interest, the method comprising the steps of:
- (a) storing machine performance data temporarily on a first-in-first-out basis in a short-term data storage device;
- (b) defining a primary event of interest;
- (c) detecting an occurrence of the primary event of interest based on the machine performance data;
- (d) sending event data associated with the occurrence of the primary event of interest to a long-term data storage device, wherein the event data includes machine performance data that was stored in the short-term data storage device prior to and substantially during the occurrence of the primary event of interest;
- (e) defining a first hierarchy to distinguish the primary event of interest from a secondary event of interest, wherein the primary event of interest is considered of higher importance than the secondary event of interest; and
- (f) replacing event data associated with the secondary event of interest in the long-term data storage device with event data associated with the primary event of interest, wherein the replacing occurs in response to a signal indicating that the long-term data storage device is unable to store the event data associated with the secondary event of interest and the event data associated with the primary event of interest.

2. The method of claim 1 wherein the signal is generated when the long-term data storage device is unable to store the event data associated with the secondary event of interest and the event data associated with the primary event of interest because of insufficient storage capacity in the long-term data storage device to accommodate both sets of event data.

3. The method of claim 1 wherein the primary event of interest is indicated by a data value that is outside a pre-defined data range.

4. The method of claim 3 wherein the first hierarchy includes a first class of events and a second class of events, wherein the first class of events are considered to be of higher importance than the second class of events, and wherein the first class of events includes the primary event of interest and the second class of events includes the secondary event of interest.

5. The method of claim 3 further comprising the step of (g) calculating a deviation of a portion of machine performance data from the pre-defined data range.

6. The method of claim 5 wherein the portion of machine performance data consists of a single data value.

7. The method of claim 5 further comprising the step of (h) comparing a first deviation of a first portion of machine performance data to a second deviation of a second portion of machine performance data in order to determine which deviation is greater.

8. The method of claim 7 further comprising the step of (i) deleting or overwriting data associated with the first portion of machine performance data if the second deviation is greater than the first deviation.

9. The method of claim 8 wherein the first hierarchy comprises the first portion of machine performance data and the second portion of machine performance data.

10. A method for automatically archiving machine performance data in a data management system before such machine performance data is deleted or overwritten, wherein archived machine performance data is associated with a detected event, the method comprising the steps of:
- (a) storing machine performance data temporarily on a first-in-first-out basis in a short-term data storage device;
- (b) defining a standard performance range for a characteristic of the machine performance;
- (c) detecting a first event indicating performance of a machine outside the standard performance range;
- (d) sending event data associated with the first event to long-term data storage device, wherein the event data associated with the first event includes machine performance data that was stored in the short-term data storage device prior to and substantially during the occurrence of the first event;
- (e) defining a first hierarchy to distinguish the first event from a second event, wherein the first event is considered of higher importance than the second event; and
- (f) replacing event data associated with the second event in the long-term data storage device with event data associated with the first event, wherein the replacing occurs in response to a signal indicating that the long-term data storage device is unable to store both the event data associated with the second event and the event data associated with the first event.

11. The method of claim 10 wherein the signal is generated when the long-term data storage device is unable to store the event data associated with the secondary event of interest and the event data associated with the primary event of interest because of insufficient storage capacity in the long-term data storage device to accommodate both sets of event data.

12. The method of claim 10 wherein the first hierarchy includes a first class of events and a second class of events, wherein the first class of events are considered to be of higher importance than the second class of events, and wherein the first class of events includes the first event and the second class of events includes the second event.

13. The method of claim 10 further comprising the steps of:
- (g) calculating deviation of a portion of machine performance data from the standard performance range; and
- (h) comparing a first deviation of a first portion of machine performance data to a second deviation of a second portion of machine performance data in order to determine which deviation is greater.

14. The method of claim 13 further comprising the step of (i) deleting or overwriting data associated with the first portion of machine performance data if the second deviation is greater than the first deviation.

15. The method of claim 13 wherein the first hierarchy comprises the first portion of data and the second portion of machine performance data.

16. A data management apparatus used in conjunction with the monitoring of the performance of a machine, the data management apparatus configured for automatically archiving machine performance data associated with an event of interest before such machine performance data is deleted or overwritten, the data management apparatus comprising:
- a short-term data storage device for storing the machine performance data temporarily on a first-in-first-out basis;
- a logic device communicatively connected with the short-term data storage device, the logic device configured for detecting that an event of interest has occurred based on a portion of data that falls outside of a programmed range of data values, and distinguishing between a first type of event and a second type of event based on a first hierarchy which ranks the first type of event as more important than the second type of event; and a long-term data storage device communicatively connected with the logic device and the short-term data storage device, the long-term data storage device for receiving from the short-term data storage device machine performance data associated with the detected occurrence of an event of interest to be archived based on the detected occurrence of the event of interest by the logic device, and wherein the long-term data storage device is configured for deleting or overwriting machine performance data associated with the second type of event of interest as needed to provide memory storage space for machine performance data associated with the first type of event of interest based on the first hierarchy, wherein the deleting or overwriting occurs in response to a signal indicating that the long-term data storage device has insufficient capacity to simultaneously store the machine performance data associated with the second type of event of interest and the machine performance data associated with the first type of event of interest.

17. The data management apparatus of claim 16 wherein the logic device is further configured for distinguishing between a first deviation of a first detected occurrence of the first type of event of interest and a second deviation of a second occurrence of the first type of event of interest, wherein the first deviation is greater than the second deviation, and wherein the data management apparatus is configured for deleting or overwriting machine performance data associated with the second deviation of the second detected occurrence saved on the long-term data storage device as needed to provide memory storage space for machine performance data associated with the first deviation of the first detected occurrence.

* * * * *